United States Patent
Kajiwara et al.

[11] Patent Number: 5,936,680
[45] Date of Patent: Aug. 10, 1999

[54] MULTIMEDIA TELEVISION RECEIVER

[75] Inventors: Mikio Kajiwara; Masashi Ochiai, both of Saitama-ken, Japan

[73] Assignee: Kabushiki Kaisha Toshiba, Kawasaki, Japan

[21] Appl. No.: 08/801,591

[22] Filed: Feb. 18, 1997

[30] Foreign Application Priority Data

Feb. 20, 1996 [JP] Japan .................................. 8-032101

[51] Int. Cl.⁶ .................................................. H04N 3/27
[52] U.S. Cl. ............................................ 348/556; 315/403
[58] Field of Search .................................. 348/542–548, 348/540, 554–556, 558; 315/403, 729, 552

[56] References Cited

U.S. PATENT DOCUMENTS

| | | | |
|---|---|---|---|
| 3,784,857 | 1/1974 | Christopher | 315/403 |
| 3,969,653 | 7/1976 | Fukaya | 315/403 |
| 4,179,643 | 12/1979 | Neuendorff | 315/411 |
| 4,184,106 | 1/1980 | Schaas | 315/403 |
| 4,234,893 | 11/1980 | Peters | 348/189 |
| 4,293,803 | 10/1981 | Fitzgerald | 315/403 |
| 4,342,095 | 7/1982 | Goodman | 711/219 |
| 4,361,785 | 11/1982 | Stapleton | 315/389 |
| 4,400,653 | 8/1983 | Olmstead | 315/408 |
| 4,660,084 | 4/1987 | Filliman et al. | 348/694 |
| 4,668,897 | 5/1987 | Haferi | 315/371 |
| 4,673,984 | 6/1987 | Kikuchi et al. | 348/730 |
| 4,679,091 | 7/1987 | Kikuchi et al. | 348/543 |
| 4,686,430 | 8/1987 | Jennings, Jr. | 315/371 |
| 4,737,691 | 4/1988 | Den Hollander et al. | 315/371 |
| 4,782,269 | 11/1988 | Haferi | 315/371 |
| 5,021,719 | 6/1991 | Arai et al. | 315/364 |
| 5,157,310 | 10/1992 | Matsuo | 315/408 |
| 5,198,731 | 3/1993 | Wu | 315/388 |
| 5,270,821 | 12/1993 | Samuels | 348/552 |
| 5,287,043 | 2/1994 | Brag | 315/371 |
| 5,304,898 | 4/1994 | Kataoka et al. | 315/411 |
| 5,410,222 | 4/1995 | Flickner | 315/383 |
| 5,519,445 | 5/1996 | Ohira | 348/556 |
| 5,638,132 | 6/1997 | Hokari et al. | 348/556 |
| 5,712,532 | 1/1998 | Ogino et al. | 315/1 |
| 5,770,930 | 6/1998 | Itoi | 315/403 |

OTHER PUBLICATIONS

Patent Abstracts of Japan vol. 017, No. 183 (E–1348), Apr. 9, 1993 & JP 04 334271 A (Toshiba Corp; Others: 01), Nov. 20, 1992.

Patent Abstracts of Japan vol. 015, No. 018 (E–1023), Jan. 16, 1991 & JP 02 266691 A (Sharp Corp), Oct. 31, 1990.

*Primary Examiner*—John K. Peng
*Assistant Examiner*—Dinh Cao Peter Chu
*Attorney, Agent, or Firm*—Pillsbury Madison & Sutro LLP

[57] ABSTRACT

A pump-up circuit includes a first capacitor C1 connected to the power supply Vcc via a first change-over switch SW1 to the reference potential point or a second capacitor C2. The second capacitor C2 is charged by the voltage control circuit 45 under the control of the pump-up voltage control signal so that the capacitors C1 and C2 are charged respectively during the scanning period. Upon input of a NTSC signal, the change-over switch SW1 is connected to the reference potential point and the charging voltage of the first capacitor C1 is used as the pump-up voltage. Upon input of a signal having a short vertical flyback period such as the signal from personal computers, the total of the charging voltages at the first and second capacitors C1 and C2 is used as the pump-up voltage.

9 Claims, 6 Drawing Sheets

WHEN NTSC SIGNAL IS INPUTTED:

FIG.5(B)

WHEN PERSONAL COMPUTER SIGNAL IS INPUTTED:

MULTIMEDIA TELEVISION RECEIVER

BACKGROUND OF THE INVENTION

1. Field of the Invention

The present invention relates to a multimedia television receiver to which signals having different deflection frequencies and/or in particular different flyback periods including the ordinary NTSC television signal and the video signal from personal computers are input and which displays such input signals on a common CRT display.

2. Description of the Related Art

A multimedia-supporting color television set which can display not only the video images from various video media including television, video tapes, CATV and laser disks but also images from various personal computers (such as multimedia personal computers with incorporated CD-ROM drives) on a single video receiver have been anticipated. In such a color television set, the video signal from general television broadcasting and a video tape player (NTSC signal) or those from a personal computer (RGB signal) is selectively inputted.

A video signal from a personal computer, however has more information than that from television broadcasting or a video tape. The video signal also has a wider frequency band and a different flyback period. For example, while the NTSC signal has a vertical flyback period of 1080 $\mu$s, the video signal from a personal computer has a quite short flyback period: 600 $\mu$s. Thus, there is a large difference. For reproduction of the video signal from a personal computer on a CRT display in particular, a pump-up control may be required to raise the wave height of the deflection voltage during the flyback period in order to smooth flyback operation by the deflection yoke of the CRT display.

Specifically, the display is designed so that the deflection yoke current during the flyback period returns from "$-\frac{1}{2}$i yp-p" to "$+\frac{1}{2}$i yp-p" (where "i yp-p" is the peak-to-peak value of the deflection yoke current) in a short time and a pump-up voltage higher than that for the scanning period is supplied to the deflection yoke during the flyback period. Note that the loss at the output stage increases if the deflection yoke voltage is pumped up for a higher voltage even during the scanning period. Therefore, it is necessary to make sure that the pump-up voltage is applied to the flyback period only.

Figure 7:
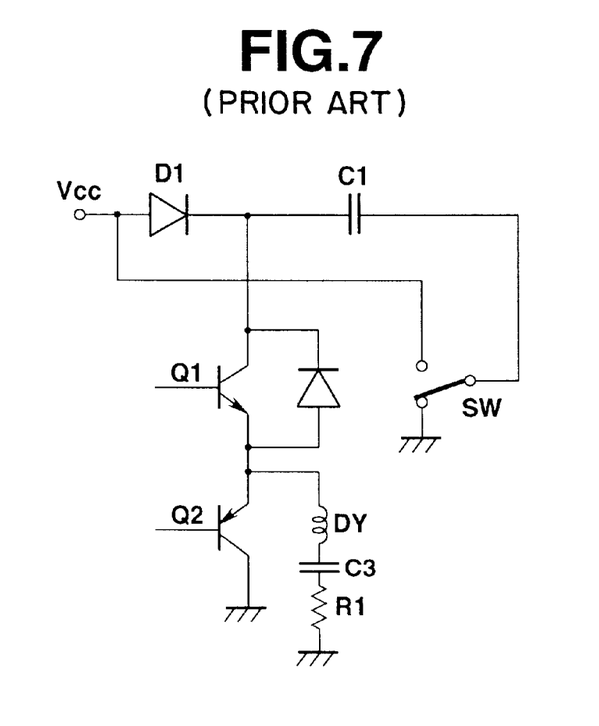
FIG. 7 is a circuit diagram to show a conventional pump-up circuit.

FIG. 7 shows an example of a conventional vertical deflection circuit provided with a pump-up circuit. The power supply voltage Vcc is supplied to the transistors Q1 and Q2 constituting a vertical output circuit connected in series via the diode D1 for reverse current prevention. These transistors Q1 and Q2 are controlled by the vertical drive signal and the vertical deflection signal is supplied to the deflection yoke DY. The output from the diode D1 charges the capacitor C1, which is connected to the reference potential point via the change-over switch SW during the scanning period of the input signal. This change-over switch SW is designed so that the capacitor C1 is connected to the power supply Vcc during the flyback period.

In such a pump-up circuit, the change-over switch SW connects, as shown in FIG. 7, the capacitor C1 to the reference potential point during the scanning period so that the capacitor C1 is charged to the voltage almost equivalent to Vcc expressed as "Vcc-VF" (where "VF" is the forward voltage drop of the diode D1) and the power supply voltage Vcc is applied to the deflection yoke DY. On the other hand, the change-over switch SW is switched so that the discharged voltage from the capacitor C1 is additionally supplied to the output stage during the flyback period. Thus, the voltage "Vcc-VF" is added to the power supply voltage Vcc and the total voltage, which is about 2 Vcc, is applied to the output stage so that the deflection yoke current is restored to the current "+$\frac{1}{2}$i yp-p" in a short period.

Since the video signals from personal computers have vertical deflection frequencies and the flyback periods which differ from the NTSC signal, the pump-up voltage during the flyback period upon receiving an input of the video signal from a personal computer is required to be higher than "2×Vcc", which is for input of the NTSC signal. Conventional solutions to this problem are as follows:

a) The pump-up voltage is always kept to three times the voltage Vcc (Vcc×3);

b) The pump-up voltage is "Vcc×2" as in the case of the NTSC signal, but the deflection yoke is provided with a smaller inductance;

c) A deflection yoke with a poor deflection sensitivity leads to a longer flyback period, which causes the vertical deflection current to go into the scanning period of the signal, resulting in folding on the screen. In such case, blanking is executed utilizing the pulse from the output stage of the vertical output circuit.

Figure 8:
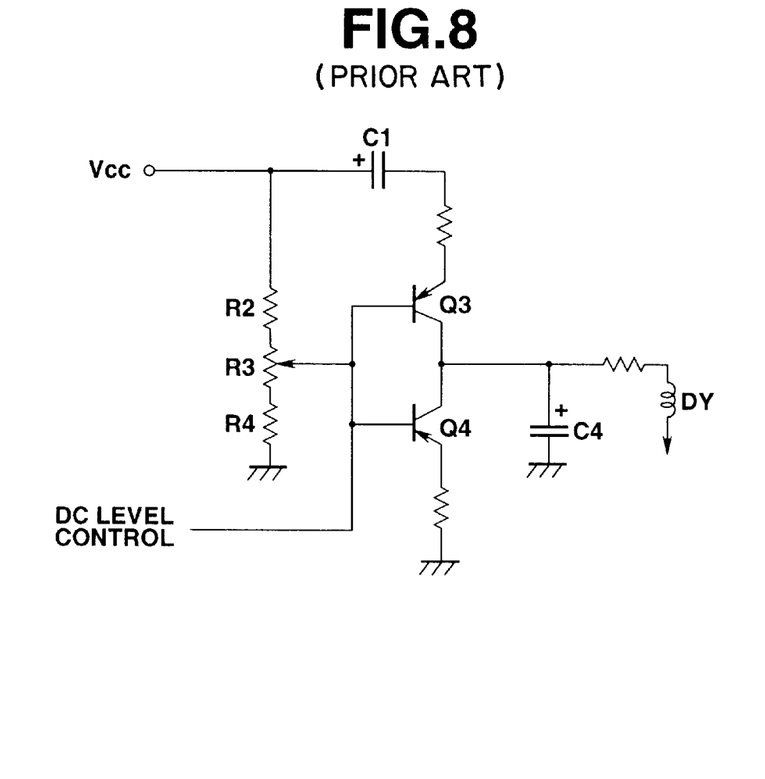
FIG. 8 is a diagram to show a conventional vertical centering circuit.

However, the solution a) results in a larger loss and b) results in a large deflection yoke current due to small inductance of the deflection yoke, which results in a larger loss at the output stage and a higher temperature at the deflection yoke. In addition, difference of the flyback period between the NTSC signal and the personal computer signal causes the vertical screen position to be shifted upward. Therefore, it is necessary to correct it by adding a centering circuit as shown in FIG. 8. In FIG. 8, the DC voltage (Vcc) is divided by the resistance circuit (R2 to R4) and the DC component is supplied via transistors Q3 and Q4 to the vertical deflection yoke DY for adjustment of the screen position. In case of c), since the scanning period or the period for images is reduced, the information amount is naturally restricted.

Figure 9A:
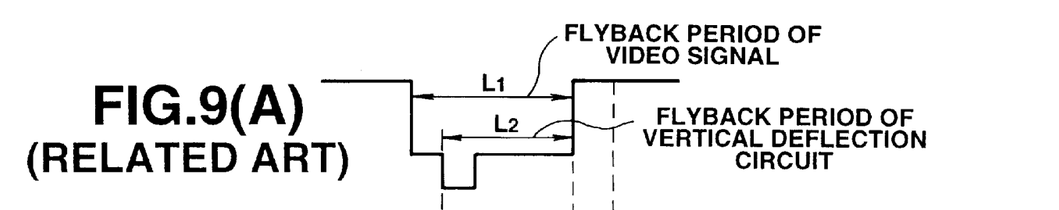
Figure 9B:
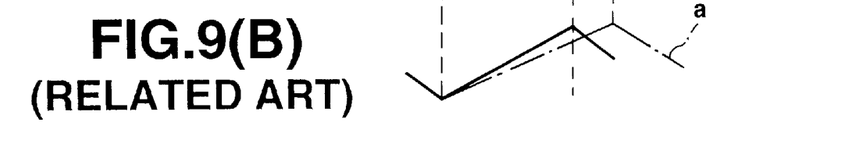

FIG. 9 (A) shows the vertical synchronizing signal in the video signal. In the vertical flyback period L1 of the video signal, the vertical flyback period L2 of the vertical deflection circuit is arranged. This vertical flyback period L2 is 1080 $\mu$s for the NTSC signal and 600 $\mu$s for the personal computer signal. The vertical deflection signal supplied to the deflection coil is, as shown in FIG. 9 (B), configured corresponding to this vertical flyback period L2. With a deflection yoke having a poor deflection sensitivity, for example, the flyback period becomes longer and goes into the image section of the video signal as shown in a.

Thus, a conventional multimedia television receiver has drawbacks that, the pump-up solutions for input of a signal with a different vertical deflection frequency or the vertical flyback period width such as the personal computer signal results in a large loss at the output stage, requires a screen position adjustment circuit or reduces the scanning period.

SUMMARY OF THE INVENTION

An objective of the present invention is to provide a multimedia television receiver which can supply an optimum pump-up voltage to the input signal having an uncertain deflection frequency.

Another objective of the present invention is to provide a multimedia television receiver having an improved pump-up means which enables vertical scanning without affecting the scanning period even when the flyback period has a narrow width such as in case of video signals from personal computers.

A multimedia television receiver according to the present invention accepts several types of input signals having different vertical flyback widths including a television signal and a second signal with a smaller vertical flyback width than the television signal. The receiver identifies the type of the input signal and separates and extracts the horizontal and vertical synchronizing signals of the input signal with signal processing means. Based on the extracted horizontal and vertical synchronizing signals, the current at the deflection coil mounted on the display means constituting the display is controlled by the horizontal and vertical deflection means. At the initial position of the vertical flyback period, the power supply voltage of this vertical deflection means is raised by the pump-up means. In this case, the pump-up means comprises first and second pump-up circuits. Upon input of said second signal, the total of the voltages at the first and the second pump-up circuits is supplied as the power supply voltage of said vertical deflection means.

Note that the first and the second pump-up means comprises a first capacitor charged by the power supply voltage and a second capacitor charged according to the second input signal. When a signal having a short flyback period, in particular, is inputted, the voltages at the first and the second capacitors are added to be the pump-up voltage, which is applied to the deflection yoke.

In a multimedia television receiver including such pump-up means, when the NTSC signal is inputted, only the discharged voltage from the first capacitor is applied to the vertical deflection means as the pump-up voltage and, when the video signal from a personal computer is inputted, the total of the voltages discharged from the first and the second capacitors are applied to the vertical deflection means as the pump-up voltage. This achieves a smooth vertical scanning without affecting the image section, corresponding to the signal with a short flyback period. By controlling the charging voltage to the second capacitor, the pump-up voltage represents three times the power supply voltage which can be applied to the output stage.

BRIEF DESCRIPTION OF THE DRAWINGS

FIG. 4 (A) is a circuit diagram to show an embodiment of a voltage control circuit.

FIG. 4 (B) is a circuit diagram to show another embodiment of a voltage control circuit.

FIG. 5 (A) is a diagram to explain the pump-up voltage when the NTSC signal is input.

FIG. 5 (B) is a diagram to explain the pump up voltage when the personal computer signal is input.

FIG. 9 (A) is a diagram to explain the vertical synchronizing signal.

FIG. 9 (B) is a diagram to show the deflection signal supplied to the deflection coil.

DETAILED DESCRIPTION OF THE PREFERRED EMBODIMENTS

Referring, to the attached figures, preferred embodiments of the present invention are described below.

Figure 1:
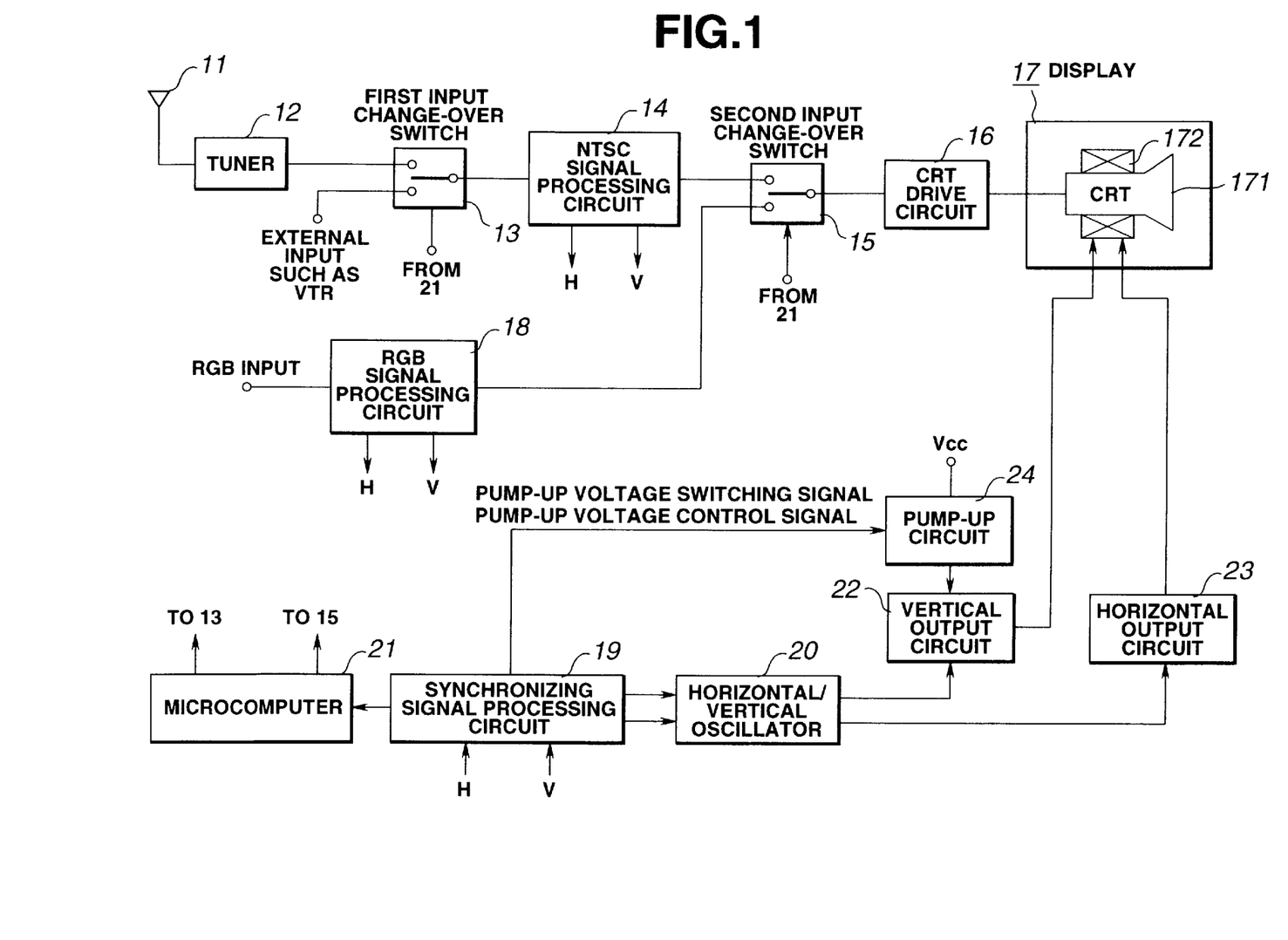
FIG. 1 is a configuration diagram to explain a multimedia television receiver according to an embodiment of the present invention.

FIG. 1 shows a general configuration of a multimedia television receiver. The television broadcasting wave received by an antenna 11 is input to a tuner 12. The base band video signal output from the tuner 12 and the external input video signal reproduced on a VTR are inputted into a first input change-over switch 13. Then, the NTSC signal selected by the change-over switch 13 is supplied to an NTSC signal processing circuit 14. The NTSC signal processing circuit 14 processes the input NTSC signal for brightness adjustment, contrast/hue adjustment and color demodulation and outputs an RGB signal. It also conducts the synchronizing separation where the horizontal (H) and vertical (V) signals are separated from the input NTSC signal and outputs the horizontal and vertical synchronizing signals H and V based on the input NTSC signal.

The output from the NTSC signal processing circuit 14 is supplied to a second input change-over switch 15. The signal selected by the change-over switch 15 is, via a CRT drive circuit 16, sent to a CRT display tube 171 of a display 17.

The computer video signal (RGB signal) from personal computers is supplied to an RGB signal processing circuit 18. This processing circuit 18 processes the inputted RGB signal in the same way as that for the NTSC signal and outputs the horizontal (H) and vertical (V) synchronizing, signals of this input RGB signal. The output from the RGB signal processing circuit 18 is sent to the second change-over switch 15. This change-over switch 15 makes selection between this signal and the output signal from the NTSC signal processing circuit 14. In other words, the second change-over switch 15 is differently controlled depending on whether the input signal is the NTSC signal or the computer signal.

Note that the synchronizing signals in the computer signals have various forms depending on the display mode of the computer as illustrated in Table 1. The deflection frequencies, synchronizing signal polarities and other properties are different corresponding to the display mode.

Referring to the display modes on Table 1, PC-98 is the display mode adopted in personal computers from NEC, VGA is that adopted by personal computers from IBM and their compatible machines, and MAC is that adopted by Macintosh series personal computers.

TABLE 1

| Item | Display mode | | | | |
|---|---|---|---|---|---|
| | PC-98 | VGA480 | VGA400 | VGA350 | MAC13" |
| Horizontal deflection frequency | 24.8 KHz | 31.5 KHz | 31.5 KHz | 31.5 KHz | 35.0 KHz |
| Vertical deflection frequency | 56.4 Hz | 60.0 Hz | 70.1 Hz | 70.1 Hz | 66.7 Hz |
| Horizontal data display period | 30.4 $\mu$s | 26.1 $\mu$s | 26.1 $\mu$s | 26.1 $\mu$s | 22.8 $\mu$s |
| Vertical data display period | 16.1 ms | 15.8 ms | 13.2 ms | 11.5 ms | 13.7 ms |
| Horizontal synchronizing signal | Negative | Negative | Negative | Positive | Composite sync. |
| Vertical synchronizing signal | Negative | Negative | Positive | Negative | (Negative) |
| Number of displayed dots | 640/400 | 640/480 | 640/400 | 640/350 | 640/480 |

The input to a synchronizing signal processing circuit 19 is the synchronizing signals H and V (Horizontal deflection frequency: 15.75 kHz; Vertical deflection frequency: 60 Hz) output from the NTSC signal processing circuit 14 or the synchronizing signals H and V (See Table 1) of the computer signal (RGB signal) output from the RGB signal processing circuit 18. The synchronizing signal processing circuit 19 identifies the input signal (whether it is the NTSC signal or one of the signals in Table 1), discriminates the polarity and detects the status of the frequencies (H and V frequencies) and the synchronizing signals. The output from this synchronizing signal processing circuit 19 controls a horizontal (H)/vertical (V) oscillator 20 and sends control instructions to a microcomputer 21 so that various computer controls such as a change-over of the second change-over switch 15 are executed. The microcomputer 21 also controls the first change-over switch 13 according to signals from an operation means (not shown).

The output from the horizontal/vertical oscillator 20 is sent to a vertical (V) output circuit 22 and a horizontal (H) output circuit 23. A pump-up circuit 24 is supplied with the pump-up voltage control signal from the synchronizing signal processing circuit 19 and the pump-up voltage from the pump-up circuit 24 is sent to the vertical output circuit 22. Then, the output signals from the vertical output circuit 22 and the horizontal output circuit 23 are supplied to a deflecting coil 172 mounted on the CRT in the display 17.

Figure 2:
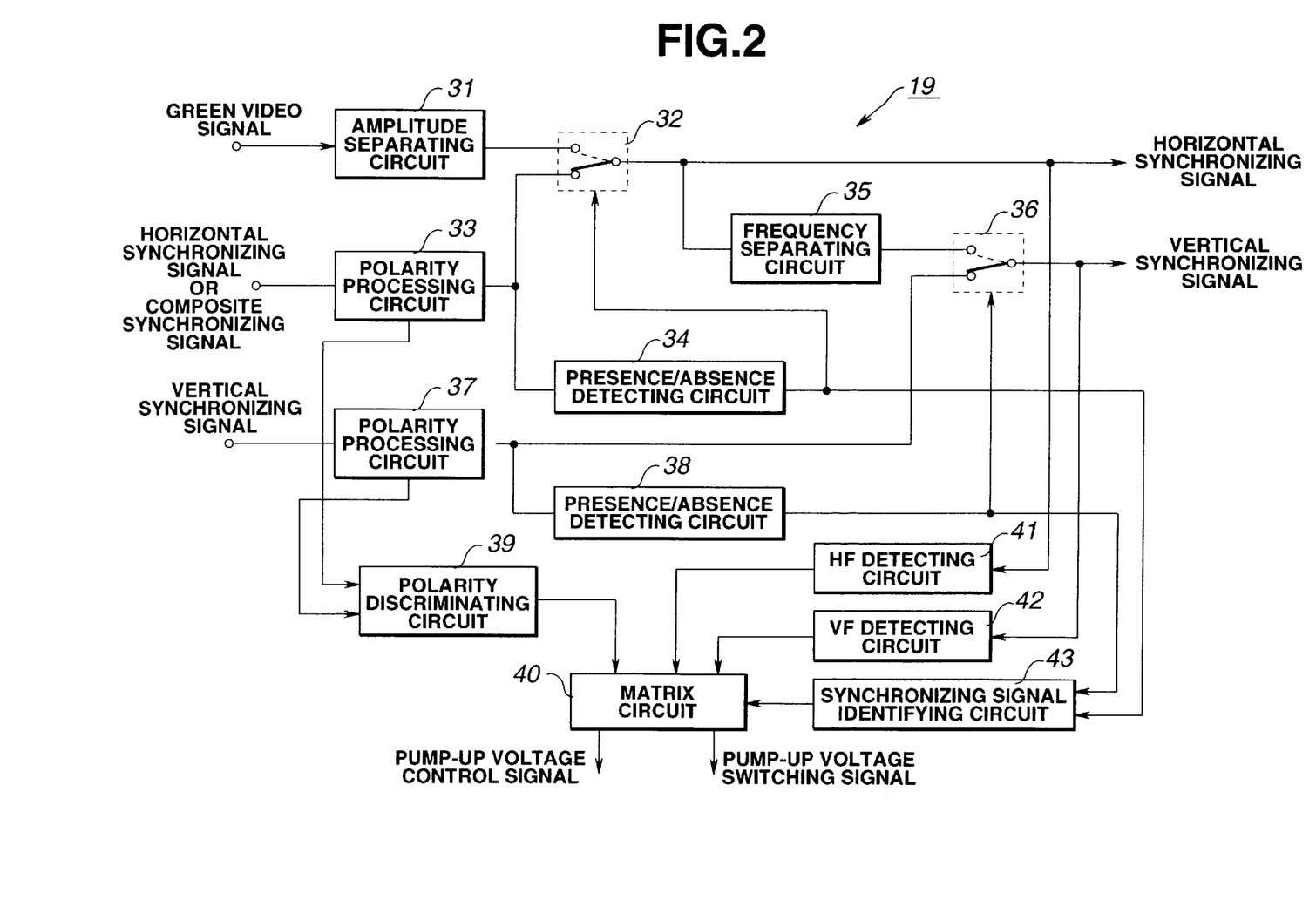
FIG. 2 is a circuit configuration diagram showing a synchronizing signal processing circuit of the above television receiver.

FIG. 2 shows the detailed configuration of a synchronizing signal processing circuit 19. The green video signal of the NTSC signal or the personal computer signal is input to an amplitude separating circuit 31 for separation of the synchronizing signals, and the composite synchronizing signal output from this circuit is supplied to one side input terminal of a change-over switch 32. The horizontal synchronizing signal or the composite synchronizing signal of the NTSC signal or the personal computer signal is input to a polarity processing circuit 33 and the output from this circuit is supplied to the other side input terminal of the change-over switch 32 and a presence/absence detecting circuit 34. The polarity processing circuit 33 outputs the horizontal synchronizing signal input with the positive or negative polarity as the signal having one of the polarities (positive polarity, for example). The polarity processing circuit 33 always outputs the horizontal synchronizing signal of the same polarity. The change-over switch 32 selects the output from the amplitude separating circuit 31 (composite synchronizing signal) upon "Absence" detection by the presence/absence detecting circuit 34 and outputs such signal as the horizontal synchronizing signal. This composite synchronizing signal is supplied to a frequency separating circuit 35 to separate the vertical synchronizing signal. The vertical synchronizing signal from the frequency separating circuit 35 is supplied to one side input terminal of a change-over switch 36.

The vertical synchronizing signal from a personal computer is inputted into a polarity processing circuit 37 and, the output from the polarity processing circuit 37 is sent to the other side input terminal of the change-over switch 36. The polarity processing circuit 37 outputs the vertical synchronizing signal input with the positive or negative polarity as the signal having one of the polarities (positive polarity, for example). The polarity processing circuit 37 always outputs the vertical synchronizing signal of the same polarity. The output from the polarity processing circuit 37 is further supplied to a presence/absence detecting circuit 38 and the output from the presence/absence detecting circuit 38 corresponding to its presence/absence discrimination controls the change-over switch 36. When "Absence" is detected, the change-over switch 36 selects the output from the frequency separating circuit 35 and outputs such signal as the vertical synchronizing signal. These horizontal and vertical synchronizing signals are supplied to the horizontal/vertical oscillator 20 in FIG. 1.

In case that the signal input in the synchronizing signal processing circuit 19 is the green video signal, the outputs of the presence/absence detecting circuits 34 and 38 show "Absence", so that the change-over switches 32 and 36 are switched into the state shown in dotted line.

In case that the signal input in the synchronizing signal processing circuit 19 is the composite synchronizing signal, the output of the presence/absence detecting circuits 34 shows "Presence" and the output of the presence/absence detecting circuits 38 shows "Absence", so that the change-over switch 32 is switched into the state shown in solid line and the change-over switch 36 is switched into the state shown in dotted line.

In case that the signals inputted into the synchronizing signal processing circuit 19 are the horizontal synchronizing signal and vertical synchronizing signal, the outputs of the presence/absence detecting circuits 34 and 38 show "Presence", so that the change-over switches 32 and 36 are switched into the state shown in solid line.

The horizontal and vertical synchronizing signals before polarity processing by the polarity processing circuits 33 and 37 are supplied to the polarity discriminating circuit 39, and the polarity discrimination output from this circuit 39 is supplied to a matrix circuit 40. The horizontal and vertical synchronizing signals respectively from the change-over switches 32 and 36 are supplied to a horizontal frequency (HF) detecting circuit 41 and a vertical frequency (VF) detecting circuit 42 respectively. The horizontal and vertical frequency signals detected by these horizontal and vertical frequency detecting circuits 41 and 42 are supplied to the matrix circuit 40. Further, the outputs of the presence/absence detecting circuits 34 and 38 are also supplied to a synchronizing signal identifying circuit 43, so that the identification result is supplied to the matrix circuit 40.

The inputs to the polarity discriminating circuit 39 are the horizontal and vertical synchronizing signals before polarity processing by the polarity processing circuits 33 and 37. The polarity discriminating circuit 39 integrates the input synchronizing signals so as to output the binary signal to show the polarity. Specifically, it outputs "0" for the synchronizing signal with positive polarity and "1" for the synchronizing signal with negative polarity so that the polarity of the input synchronizing signal is discriminated. The matrix circuit 40 checks the horizontal and vertical frequencies from the HF detecting circuit 41 and the VF detecting circuit 42, the synchronizing signal polarity from the polarity discriminating circuit 39 and the form of the synchronizing signal (such as separate sync., composite sync. or sync-on-green) from the synchronizing signal identifying circuit 43 to judge whether the signal is the NTSC signal or the personal computer signal. In case of the personal computer signal, it further identifies the type of the personal computer signal by checking the combination of at least two of the above data and outputs the pump-up voltage control signal corresponding to the identified type. At the same time, it outputs the pump-up voltage switching signal corresponding to the NTSC input or personal computer input. The pump-up voltage switching signal is output synchronizing with the flyback period in the NTSC or personal computer signal.

Figure 3:
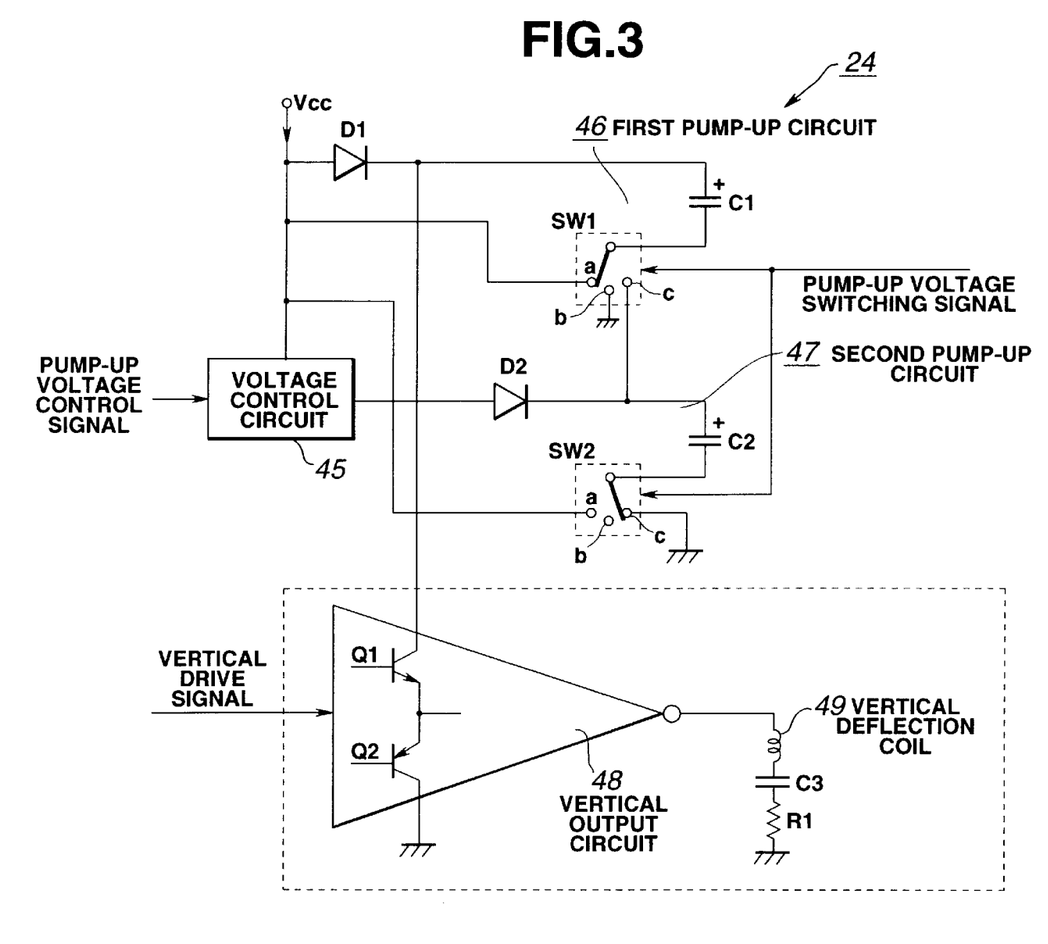
FIG. 3 is a circuit diagram to explain a first embodiment of a pump-up circuit of the above television receiver.

FIG. 3 shows the configuration of the pump-up circuit 24 according to a first embodiment. The power supply voltage Vcc is supplied to a first capacitor C1 as the charging voltage via a diode D1 for reverse current prevention. The capacitor C1 is connected to the traveling contact of the first change-over switch SW1, which is in turn connected to the power supply Vcc at the fixed contact "a", connected to the reference potential point at the fixed contact "b" and connected to a second capacitor C2 at the fixed contact "c". To the second capacitor C2, the voltage output from a voltage control circuit 45 being supplied with the voltage Vcc is supplied as the charging voltage via a diode D2.

The capacitor C2 is connected to the traveling contact of the second change-over switch SW2, which is in turn connected to the power supply Vcc at the fixed contact "a", connected with nothing at the fixed contact "b" and connected to the reference potential point at the fixed contact "c". In short, a first pump-up circuit 46 containing the first capacitor C1 is connected in series with a second pump-up circuit 47 containing the second capacitor C2.

The voltage Vcc output from the diode D1 is supplied to a vertical output circuit 48. The vertical output circuit 48 comprises the output transistors Q1 and Q2 connected in series. The output from the mutual connecting point between the transistors Q1 and Q2 is taken out as the output of the vertical output circuit 48 and supplied to a vertical deflection coil 49.

Thus, for the horizontal and vertical synchronizing signals outputted from the synchronizing signal processing circuit 19 in FIG. 2 as a result of inputting the RGB signal from a personal computer, the type of the personal computer sending the input signal is identified based on the form of the synchronizing signal (separate, composite or sync-on-green), horizontal and vertical frequencies and the synchronizing signal polarity. The pump-up voltage control signal is generated according to such an identification result. The control signal has different pulse widths corresponding to the vertical frequency. Such a pulse signal is made to be a direct current for control of the voltage control circuit 45 (See FIG. 3). As the pulse signal frequency becomes higher, a higher voltage is outputted from the pump-up voltage control circuit 45 (Vcc at max. and 0 at min.).

Thus, the second capacitor C2 charged by the output voltage from the pump-up voltage control circuit 45 is variably controlled in the range from 0 to Vcc. Upon inputted of the video signal from a personal computer, the first change-over switch SW1 is connected to the contact "b" during the scanning period and the second change-over switch SW2 is connected to the contact "c". In other words, the first capacitor C1 is charged by the voltage Vcc and the second capacitor C2 is charged corresponding to the output voltage from the voltage control circuit 45. During this flyback period upon input of the personal computer signal, the pump-up voltage switching signal switches the first change-over switch SW1 to the fixed contact "c" and the second switch SW2 to the fixed contact "a". In this case, an added value of the charged voltages at the first and second capacitors C1 and C2 is added to the voltage Vcc and the variable voltage corresponding to such additional voltage (2 Vcc to 3 V cc) is supplied to the vertical output circuit 48 as the pump-up voltage in the flyback period. C3 represents a smoothing capacitor and R1 is a feedback resistor.

On the other hand, when the NTSC signal is inputted, the change-over switch SW1 is connected to the contact "b" so that the capacitor C1 is charged with the voltage Vcc and the change-over switch SW2 is connected to the contact "b" during the scanning period. During the flyback period, the change-over switch SW1 is connected to the contact "a" so that the voltage of about 2 V cc is supplied to the vertical output circuit 48 as the power supply voltage.

Figure 4A:
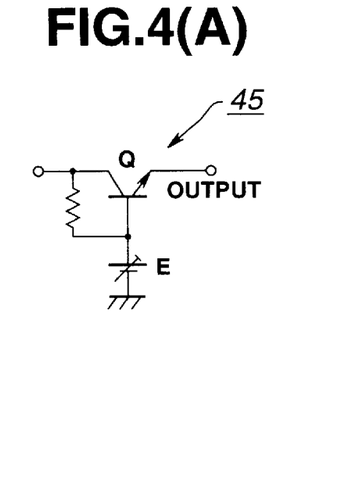
Figure 4B:
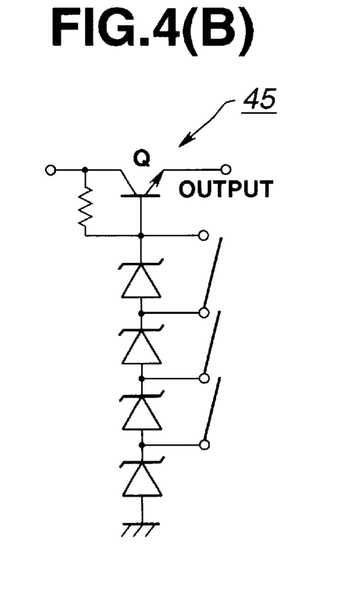

FIGS. 4(A) and 4(B) show specific examples of the voltage control circuit 45. In FIG. 4(A), the circuit includes a voltage control transistor Q so that the outputted voltage is output from its emitter. Connected to the base of the transistor Q is a variable voltage source E serving as the control voltage source, whose voltage is variably controlled by the pump-up voltage control signal. Alternatively, as shown in FIG. 4(B), a plurality of zener diodes may be connected in series with the base of the voltage control transistor Q so that the zener diodes may be selectively short-circuited across the ends by the pump-up voltage control signal for variable control of the control voltage at the base of the transistor Q. The output voltage is variably controlled corresponding to the number of zener diodes connected in series.

Figure 5A:
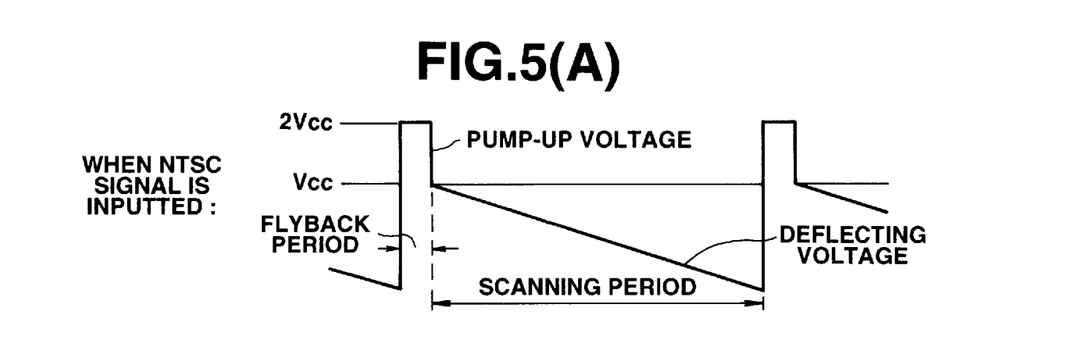
Figure 5B:
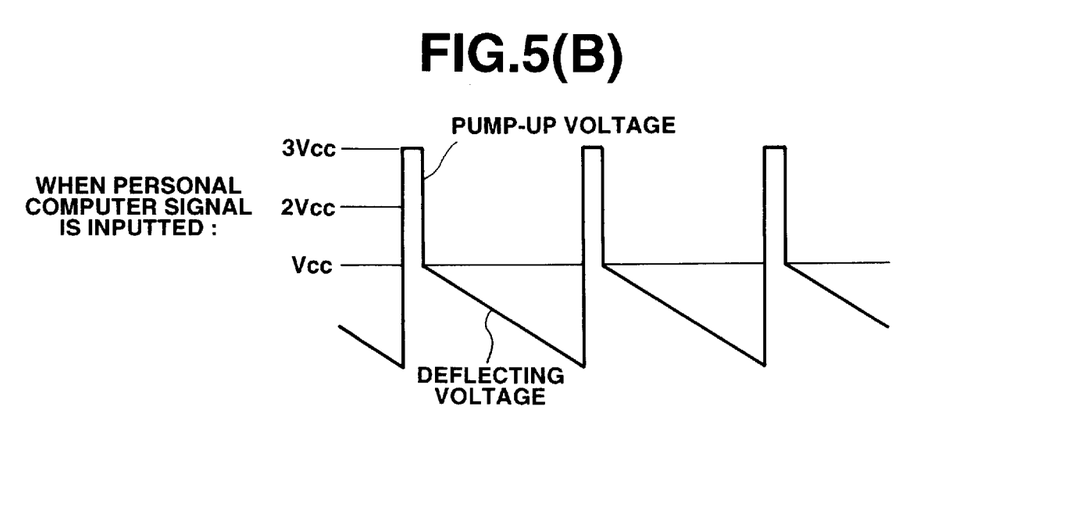

FIG. 5 (A) shows the pump-up voltage when the NTSC signal is inputted and FIG. 5 (B) shows the pump-up voltage upon receiving an input of the personal computer signal. It is understood that the synchronizing signal has a higher frequency upon input of the personal computer signal and the higher the frequency, the higher the flyback period voltage becomes in the pump-up voltage, with reducing the width of the flyback period. The pump-up voltage for such flyback period can be also variably controlled in the range from 2 V cc to 3 V cc.

Figure 6:
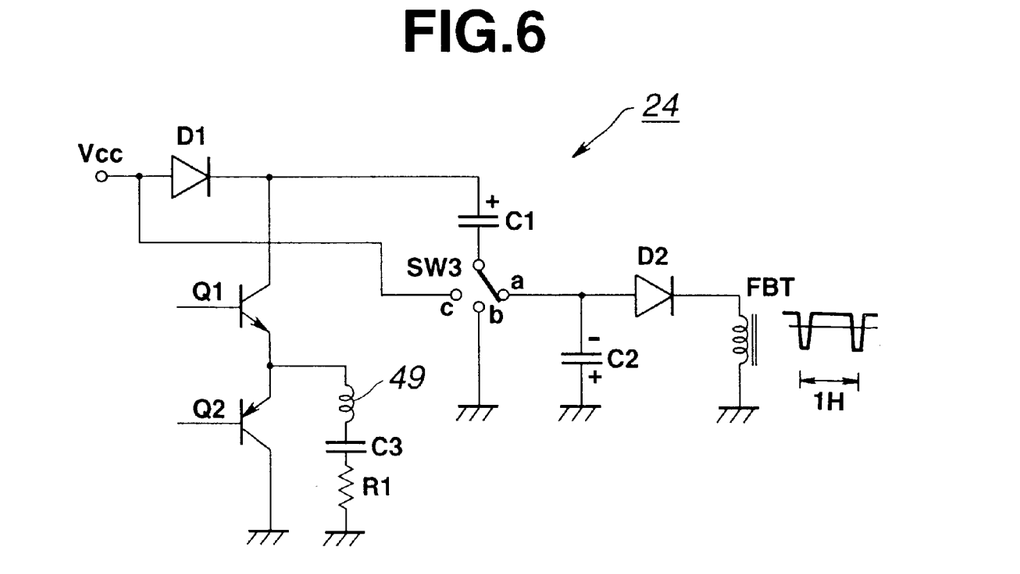
FIG. 6 is a circuit diagram to explain a second embodiment of the above pump-up circuit.

FIG. 6 shows a pump-up circuit 24 according to a second embodiment. The power supply voltage Vcc is, via a diode D1, connected to the first capacitor C1, which, in turn is connected to the traveling contact of the change-over switch SW3. The change-over switch SW3 is provided with fixed contacts "a" to "c". To the contact "a", a flyback transformer (FBT) is connected via a diode D2. The contact "c" is connected to the power supply Vcc. In addition, the power supply Vcc is, via the diode D1, connected to a serial circuit of transistors Q1 and Q2 constituting a vertical output circuit. To the contact point of the transistors Q1 and Q2, a deflection coil 49 is connected.

Specifically, during the scanning period of the personal computer input signal, the change-over switch SW3 is connected to the contact "a" so that the capacitors C1 and C2 are charged. At this time, the second capacitor C2 is charged with the negative voltage −Vc by the flyback pulse via the diode D2 connected to the tertiary winding of the flyback transformer (FBT). Therefore, the voltage across the first capacitor C1 is charged to be (Vcc−VF+Vc) (where "VF" is the forward voltage drop of the diode D1 and Vcc is the across voltage of the capacitor C2). If Vcc=Vc, the voltage of about 2 V cc is charged here. During the flyback period, the traveling contact is switched to the fixed contact "c" of the switch SW3. The voltage applied to the collector of the output transistor Q1 is (Vcc+Vcc−VF+Vc), or about 3 V cc.

Upon input of the NTSC signal, the traveling contact of the change-over switch SW3 is connected to the fixed contact "b". In this case, the first capacitor C1 is charged by the power supply voltage Vcc in the scanning period. During the flyback period, the traveling contact of the change-over switch SW3 is connected with the fixed contact "c" and the voltage of "Vcc+(Vcc−VF)", or about 2 V cc is supplied to the collector of the output transistor Q1.

Though the above description takes the NTSC signal as an example of the general TV signal, it is possible to support the input of PAL or other system signals.

Thus, with a multimedia television receiver according to the present invention, the optimum pump-up voltage is supplied for uncertain input signal frequency and, particularly for a short flyback period of the video signal from a personal computer, the optimum pump-up voltage is supplied so that the vertical scanning is executed without affecting the scanning period.

It is naturally understood that the present invention is not limited to the embodiments described above, and various modifications can be made for practice within the scope and spirit of the invention.

What is claimed is:

1. A multimedia television receiver to which several types of input signals having different vertical flyback widths are inputted, comprising:

input judgment means for judging the type of said input signal according to horizontal and vertical frequencies and positive or negative polarities of said input signal;

signal processing means for separating and extracting the horizontal and vertical synchronizing signals of said input signal;

horizontal and vertical deflection means for controlling a deflection coil current of display means constituting a display according to said extracted horizontal and vertical synchronizing signals; and pump-up means which, at the initial position of the vertical flyback period of the vertical deflection signal, arranges the power supply voltage of said vertical deflection means for rising, wherein said pump-up means comprises a first pump-up circuit for generating a first pump-up voltage and a second pump-up circuit for generating a second pump-up voltage which can be controlled upon input of a first signal with a relatively wide vertical flyback width said first pump-up voltage is supplied to said vertical deflection means as the power supply and, upon input of a second signal with a narrower vertical flyback width than said first signal, said second pump-up voltage is controlled in response to a result of judgment by said input judgment means, and said first pump-up voltage and, said controlled second pump-up voltage are totaled to be supplied to said vertical deflection means as the power supply voltage.

2. A multimedia television receiver according to claim 1, wherein said first pump-up circuit includes a first capacitor being charged by a predetermined power supply voltage;

said second pump-up circuit includes a means responsive to the result judgment of said input judgment means variable control said power supply voltage and a second capacitor being charged by said controlled voltage, upon input of said first signal, a first pump-up voltage using the charging voltage of said first capacitor is supplied to said vertical deflection means as the power supply voltage; and upon input of said second signal the charging voltages of said first and second capacitors are totaled to be used as a second pump-up voltage and supplied to said vertical deflection means as the power supply voltage.

3. A multimedia television receiver according to claim 2, wherein said pump-up means has a means for generating a switching signal that has different signal levels during the vertical flyback period of the input signal and scanning period respectively;

having a first and second switches responsive to said switching signal to be switched and controlled;

said first and second switches are connected to said first and second capacitors respectively;

during the scanning period, said first and second capacitors are connected to respective power voltage sources to charge said first and second capacitors respectively; and upon input of said second signal, the power supply voltage of said second capacitor is controlled in response to the response to the result of judgment by said input judgment means, and during the flyback period, said first capacitor is connected in series with said second capacitor and the charging voltages of the first and second capacitors are totaled to be used as the pump-up voltage and supplied to said vertical deflection means as the power supply voltage.

4. A multimedia television receiver according to claim 2, wherein the power supply voltage for charging said second capacitor is varied by a voltage varying means in response to the result of judgment of said input means;

having as this voltage varying means, a voltage controlled transistor a collector of which is connected to the power supply voltage source;

the base voltage of this transistor is varied in response to the result of judgment to obtain a controlled voltage from the emitter, and the voltage is supplied to the second capacitor.

5. A multimedia television receiver according to claim 1, wherein the input judgment means judges the horizontal and vertical frequencies and positive or negative polarities of the input signal and also judges the form of the synchronizing signal to judge the type of the input signal.

6. A multimedia television receiver according to claim 1, wherein said pump-up means comprises:

a power supply voltage source;

first and second capacitor and switch means;

the switch means is switched to operate in response to the result of judgment of the judgment means;

the flyback pulse of negative polarity is rectified to obtain DC voltage;

upon input of the first signal, during the scanning period, only the first capacitor is charged by said power supply voltage source, and during the flyback period, this charging voltage is used to supply the first pump-up voltage;

upon input of the second signal, the first capacitor is connected in series with the second capacitor to charge the first and second capacitor to charge by said power supply voltage source during the scanning period, and also the second capacitor is charged by DC voltage of the flyback pulse as rectified, and during the flyback period, the charging voltages of the first and second capacitors are totaled to be used as the second pump-up voltage and supplied.

7. A multimedia television receiver according to claim 1 further comprising discrimination means to discriminate the horizontal and vertical frequencies and positive or negative polarities of the input signal, wherein said input second signal and its type are identified based on the discrimination output from said discrimination means so that said pump-up voltage can be selectively switched.

8. A multimedia television receiver according to claim 1 further comprising discrimination means to discriminate the horizontal and vertical frequencies, positive or negative polarities and synchronizing signal form of the input signal, wherein said input second signal and its type is identified based on the discrimination output from said discrimination means so that said pump-up voltage can be selectively switched.

9. A multimedia television receiver according to claim 1, wherein said first and second pump-up circuits are respectively provided with the first and second capacitors under charging control and, upon input of a signal with a narrow vertical flyback width, said first and second capacitors are connected in series and charged with the power supply voltage and said second capacitor is further charged with the flyback voltage from the flyback transformer so that the total of the charging voltage of said first and second capacitors is output as the pump-up voltage for the flyback period and, upon input of a signal with a wide vertical flyback width, said first capacitor only is charged with the power supply voltage during the scanning period and the charging voltage at said first capacitor is output as the pump-up voltage during the flyback period.

* * * * *